US011396337B2

United States Patent
Beuting et al.

(10) Patent No.: US 11,396,337 B2
(45) Date of Patent: Jul. 26, 2022

(54) ADJUSTABLE SEAT ASSEMBLY FOR A TILTING VEHICLE AND TILTING VEHICLE WITH SUCH AN ADJUSTABLE SEAT ASSEMBLY

(71) Applicant: Bayerische Motoren Werke Aktiengesellschaft, Munich (DE)

(72) Inventors: Guido Beuting, Munich (DE); Joerg Seiler, Munich (DE); Rainer Wamser, Emmering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/414,807

(22) PCT Filed: Dec. 2, 2019

(86) PCT No.: PCT/EP2019/083321
§ 371 (c)(1),
(2) Date: Jun. 16, 2021

(87) PCT Pub. No.: WO2020/151862
PCT Pub. Date: Jul. 30, 2020

(65) Prior Publication Data
US 2022/0017170 A1  Jan. 20, 2022

(30) Foreign Application Priority Data
Jan. 24, 2019 (DE) .................... 10 2019 101 714.9

(51) Int. Cl.
*B62J 1/10* (2006.01)
*B62J 1/26* (2006.01)
(52) U.S. Cl.
CPC .. *B62J 1/10* (2013.01); *B62J 1/26* (2013.01)

(58) Field of Classification Search
CPC ......... B62J 1/10; B62J 1/26; B62J 1/00; B62J 1/18; B60N 2/914; B60N 2/1803;
(Continued)

(56) References Cited

U.S. PATENT DOCUMENTS 5,020,852 A  * 6/1991 Marion ..................... B62J 1/26
                                                        297/214
5,658,050 A    8/1997 Lorbiecki
(Continued)

FOREIGN PATENT DOCUMENTS

CN    1746067 A      3/2006
CN    1899907 A  *  1/2007
(Continued)

OTHER PUBLICATIONS

International Search Report (PCT/ISA/210) issued in PCT Application No. PCT/EP2019/083321 dated Feb. 5, 2020 with English translation (five (5) pages).
(Continued)

*Primary Examiner* — Milton Nelson, Jr.
(74) *Attorney, Agent, or Firm* — Crowell & Moring LLP

(57) ABSTRACT

An adjustable seat assembly for a tilting vehicle includes a seat pan configured to be secured in a fixed position with respect to a frame of the tilting vehicle, at least one cushion unit arranged on the seat pan and forming a seat surface, and at least one adjustment device by which the seat surface is transferable from a low seat position into at least one raised seat position. In addition or alternatively, the at least one adjusting device may alter an inclination of the seat surface relative to the seat pan. The cushion unit has at least one base cushion secured in a fixed position on the seat pan, and at least one adjustable cushion which is movable relative to the base cushion by the adjustment device.

8 Claims, 1 Drawing Sheet

(58) Field of Classification Search
CPC ... B60N 2002/022; B60N 2/1635; B60N 2/185; B60N 2205/30
USPC .......................................... 297/284.1, 452.41
See application file for complete search history.

(56) References Cited

U.S. PATENT DOCUMENTS

| | | | |
|---|---|---|---|
| 5,975,629 | A | 11/1999 | Lorbiecki |
| 2015/0084390 | A1* | 3/2015 | Tanaka .................. B60N 2/4263 297/338 |
| 2015/0175230 | A1 | 6/2015 | Baruzzo |
| 2015/0298753 | A1 | 10/2015 | Rouland et al. |
| 2016/0200230 | A1 | 7/2016 | Haller |
| 2016/0339803 | A1 | 11/2016 | Beuschel et al. |

FOREIGN PATENT DOCUMENTS

| | | | | |
|---|---|---|---|---|
| CN | 100579856 | C | | 1/2010 |
| CN | 105473353 | A | | 4/2016 |
| CN | 106103183 | A | | 11/2016 |
| DE | 197 19 965 | C2 | | 3/1999 |
| DE | 10 2018 131 582 | A1 | | 6/2020 |
| EP | 650864 | A1 | * | 5/1995 ........... B60N 2/3086 |
| FR | 2825328 | A1 | * | 12/2002 ............... A47C 3/24 |
| JP | S62238135 | A | * | 10/1987 |
| JP | 2018103655 | A | * | 7/2018 |
| WO | WO 2013/124829 | A1 | | 8/2013 |
| WO | WO 2014/105316 | A1 | | 7/2014 |

OTHER PUBLICATIONS

German-language Written Opinion (PCT/ISA/237) issued in PCT Application No. PCT/EP2019/083321 dated Feb. 5, 2020 (five (5) pages).

German-language Search Report issued in German Application No. 10 2019 101 714.9 dated Oct. 28, 2019 with partial English translation (12 pages).

Cover Page of EP 2 817 204 A1 published Dec. 31, 2014 (one (1) page).

Chinese-language Office Action issued in Chinese Application No. 201980086140.6 dated Feb. 22, 2022 with English translation (15 pages).

* cited by examiner

ND SUMMARY OF THE
ADJUSTABLE SEAT ASSEMBLY FOR A TILTING VEHICLE AND TILTING VEHICLE WITH SUCH AN ADJUSTABLE SEAT ASSEMBLY

BACKGROUND AND SUMMARY OF THE INVENTION

The invention relates to an adjustable seat assembly for a tilting vehicle, with a seat pan which is fixed in a stationary manner with respect to a frame of the tilting vehicle, with at least one cushion unit which is arranged on the seat pan and forms a seat face on a side which faces away from the seat pan, and with at least one adjusting device, by means of which the seat face can be transferred from a low seat position, in which the spacing of the seat face from the seat pan is at a minimum, into at least one elevated seat position, in which the spacing of the seat face from the seat pan is increased with regard to the low seat position, and/or by way of which adjusting device an inclination of the seat face with respect to the seat pan can be set, and to a tilting vehicle with a seat assembly of this type.

Different embodiments of tilting vehicles with an adjustable seat assembly are known. For the height adjustment of the seat bench, an adjusting apparatus is typically provided below the seat bench, which adjusting apparatus is actuated mechanically or electrically and is configured to adjust the height of the seat bench.

In the case of motorcycles, the seat bench usually adjoins the tank of the motorcycle. In the case of a height adjustment of the seat bench, a gap which is situated between the tank and the seat bench therefore changes. In addition, in the case of the height adjustment, a gap between the seat bench and the body of the motorcycle, for example between the seat bench and a side trim panel, also changes. If these gaps become too large, rainwater can penetrate into one of the gaps and can pass to components of the motorcycle which are situated below the seat bench.

An adjustable seat assembly of the generic type is known from DE 10 2018 131 582.1. In the case of this known seat assembly, two seat shells are moved relative to one another. As a result, it is made possible for the seat height of the seat assembly to be set individually.

It is one object of one exemplary embodiment of the invention to propose an alternative expedient overall design.

In the case of an adjustable seat assembly mentioned at the outset, this object is achieved by virtue of the fact that the cushion unit has at least one base cushion which can be fixed or is fixed in a stationary manner on the seat pan, and at least one adjusting cushion which comprises the seat face and can be moved relative to the base cushion by way of the adjusting device.

An alternative expedient overall design of the seat assembly is realized by virtue of the fact that the cushion unit has at least one base cushion which can be fixed or is fixed in a stationary manner on the seat pan, and at least one adjusting cushion which comprises the seat face and can be moved relative to the base cushion by way of the adjusting device. The base cushion and the adjusting cushion can fundamentally be oriented with respect to one another as desired.

The cushion unit can comprise one or more base cushions. In particular, the base cushion can be formed from one or a plurality of base cushion elements. Moreover, the adjusting unit can comprise one or more adjusting cushions. In particular, the adjusting cushion can comprise one or more adjusting cushion elements. If the adjusting cushion comprises more than one adjusting cushion element, the individual adjusting cushion elements can be capable of being transferred jointly or independently of one another into one and the same seat position or into different elevated seat positions. As a result, the setting of the seat assembly is improved.

The stability of the seat assembly can be increased if the base cushion has at least one recess which extends along the vertical axis of the tilting vehicle and in which the adjusting cushion is arranged so as to engage with at least one gap section, and/or if the adjusting cushion comprises at least one recess which extends along the vertical axis of the tilting vehicle and in which the base cushion is arranged so as to engage with at least one gap section.

In such cases, the base cushion and the adjusting cushion are fixed or at least limited in terms of their relative movement to one another transversely with respect to the vertical axis of the tilting vehicle.

In one development of the last-mentioned embodiment, it proves to be advantageous if the at least one recess comprises, at least in sections, a cross section which tapers, in particular conically, and/or if the gap section comprises a cross section which corresponds to the recess and, in particular, is complementary in the low seat position.

By virtue of the fact that the recess comprises a cross section which tapers, in particular conically, the adjusting cushion and the base cushion are automatically oriented with respect to one another during the transfer from the elevated seat position back into the low seat position.

In order to limit the movement of the adjusting cushion with respect to the base cushion, it proves to be advantageous if the adjusting cushion comprises at least one stop section which protrudes beyond the recess transversely with respect to the vertical axis of the tilting vehicle, and on which the base cushion and the adjusting cushion bear against one another, in particular in a cover-like manner, on a side of the base cushion which faces away from the seat pan, at least in the low seat position.

Moreover, the cushion unit can be of space-saving and compact configuration by way of an arrangement of this type. This is achieved by virtue of the fact that, in the low seat position, the adjusting cushion is arranged at least substantially within the base cushion.

The compact configuration of the seat assembly can be improved further if the adjusting cushion and the base cushion in each case comprise an outer contour which continues in a flush and stepless manner with respect to one another, at least in the low seat position.

As a result, pleasant seating on the seat assembly is realized, in particular, for a user of the tilting vehicle.

Furthermore, it is provided in the case of one embodiment of the seat assembly that the seat assembly comprises at least one covering means which surrounds the base cushion and the adjusting cushion to the outside at least approximately completely in the low seat position and in the elevated seat position.

As a result, the configuration of the cushion unit from two or more components cannot be seen from the outside.

In one development of the last-mentioned embodiment, it proves to be advantageous if the covering means is fixed directly on the seat pan and comprises a reserve surface, by way of which a surface difference from the low seat position to the elevated seat position can be compensated for, or if the covering means can be deformed elastically, and/or if the covering means can be fixed or is fixed indirectly on the seat pan by way of an elastic tensioning means.

A reserve surface is understood to mean that, at least in the low seat position, the covering means has a material overhang which is not configured so as to bear tautly against the cushion unit. In such cases, the covering means can also comprise an inelastic material. If the covering means can be deformed elastically, the covering means can also be configured in the low seat position to be tensioned at least substantially tautly over the cushion unit.

If a tensioning means is provided between the covering means and the seat pan, the covering means can be of elastic or inelastic configuration. The tensioning means can comprise an elastically deformable element and/or a roll-up element, by way of which the covering means can be wound onto and unwound from a reel or spool.

It proves to be advantageous if the covering means prestresses the adjusting cushion into the low seat position, and/or if the covering means comprises a film or an elastic textile.

In this way, a return means is configured in a simple way, which return means makes a return of the adjusting cushion into the low seat position possible, in addition or as an alternative to the adjusting device, when the adjusting device is moved into the low seat position.

The adjusting device can fundamentally be configured in any desired way, in so far as it fulfills the technical function of actuating the adjusting cushion with regard to the base cushion in such a way that the seat face can be transferred from the low seat position into the elevated seat position and vice versa.

The adjusting device can comprise, for example, a toggle lever which is arranged in a force-transmitting manner between the seat pan and the adjusting cushion, or as a cam which is arranged on a shaft, in order to displace the adjusting cushion with regard to the seat pan in the case of rotation of the shaft. In the case of one embodiment of the seat assembly, it proves to be advantageous if the adjusting device comprises at least one fluid cushion which can be set pneumatically and/or hydraulically and is arranged between the adjusting cushion and the seat pan or the base cushion.

The fluid cushion can be connected, for example, in a fluid-conducting manner to a pump, it being possible for fluid to be pumped into or discharged from the fluid cushion by way of the pump.

Furthermore, it proves to be advantageous if the adjusting device is configured in such a way that, in addition to the transfer from the low seat position into the elevated seat position, setting of the inclination of the seat face with regard to the base cushion can also be realized.

In the case of a further embodiment of the seat assembly, the adjusting device comprises a plurality of adjusting elements which can be actuated and deflected jointly or independently of one another by way of an adjusting cushion which is configured from a plurality of adjusting cushion elements, in order to transfer the individual adjusting cushion elements into the same seat position or into different elevated seat positions. As a result, the setting capability of the seat assembly is increased further.

Moreover, embodiments of the seat assembly are provided, in the case of which the adjusting device can be actuated mechanically and/or electrically. For example, in the case of one embodiment of the seat assembly, the pump for building up a hydraulic and/or pneumatic pressure in the fluid cushion can be capable of being actuated manually. To this end, the adjusting device can comprise a bellows which can be gripped manually.

Finally, the object is achieved by way of a tilting vehicle with at least one seat assembly with at least one of the above-mentioned features.

A tilting vehicle is understood to mean bicycles, motorcycles, or motorcycle-like motor vehicles, such as motor scooters, in particular two-wheeled, three-wheeled or four-wheeled motor scooters, scooters, tilting trikes, quads or the like.

Further features, details and advantages of the invention result from the appended patent claims, from the illustration in the drawing, and the following description of one preferred embodiment of the seat assembly.

DETAILED DESCRIPTION OF THE DRAWINGS

Figure 1:
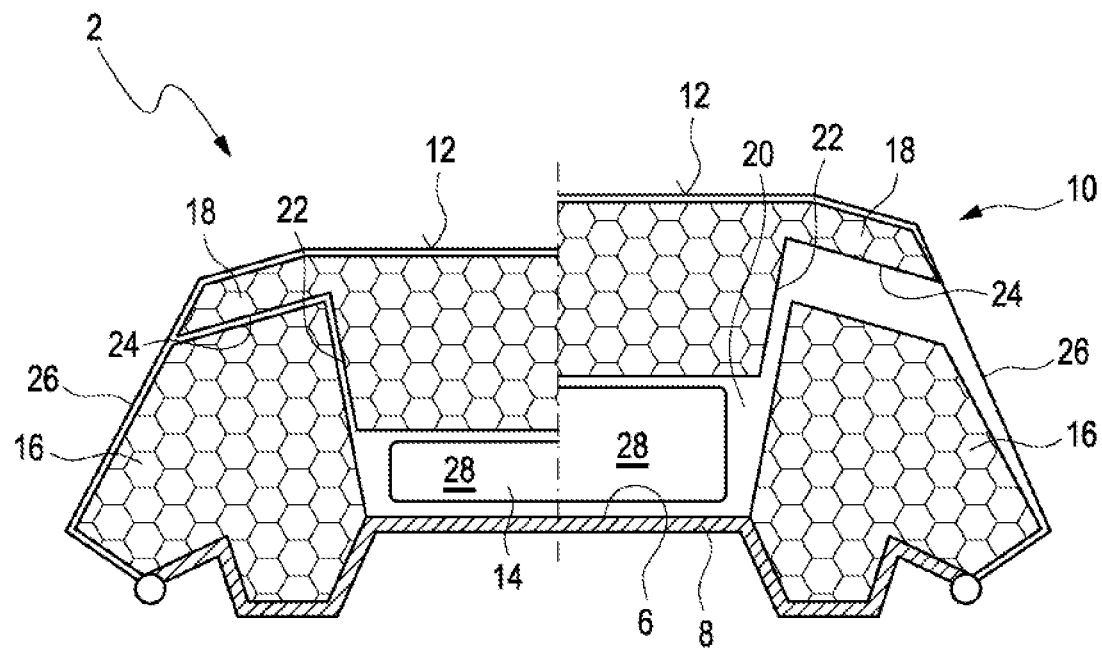
FIG. 1 shows a diagrammatic sectional view through one exemplary embodiment of the seat assembly of the present invention in a comparison of a low seat position and an elevated seat position.
Figure 2:
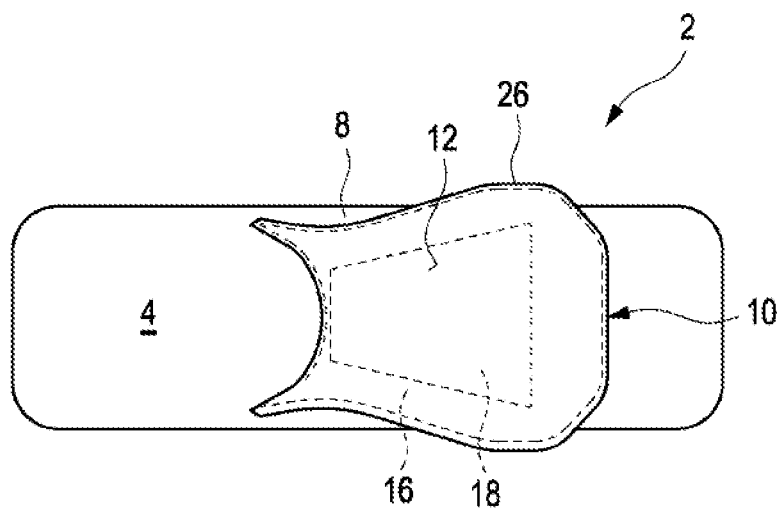
FIG. 2 shows a top view of the exemplary embodiment of the seat assembly according to FIG. 1.

FIG. 1 shows an adjustable seat assembly which is provided overall with the designation 2 for a tilting vehicle 4 (shown diagrammatically in FIG. 2). The seat assembly 2 comprises a seat pan 6 which is fixed in a stationary manner with regard to a frame 8 of the tilting vehicle 4. Furthermore, the seat assembly 2 comprises a cushion unit 10 which forms a seat face 12 on a side which faces away from the seat pan 6. In order to adjust the seat face 12, the seat assembly 2 comprises an adjusting device 14, by way of which the seat face 12 can be transferred from a low seat position (left-hand side in FIG. 1), in which the spacing of the seat face 12 from the seat pan 6 is at a minimum, into at least one elevated seat position (right-hand side in FIG. 1), in which the spacing of the seat face 12 from the seat pan 6 is increased with regard to the low seat position, and/or by way of which adjusting device 14 an inclination of the seat face 12 with respect to the seat pan 6 can be set.

In the case of the exemplary embodiment which is shown in the figures, the cushion unit 10 comprises at least one base cushion 16 which is fixed in a stationary manner on the seat pan 6, and at least one adjusting cushion 18 which comprises the seat face 12 and can be moved relative to the base cushion 16 by way of the adjusting device 14.

In the case of the exemplary embodiment which is shown in the figures, the cushion unit 10 comprises a recess 20 which extends along the vertical axis of the tilting vehicle 4. This recess 20 is arranged in the base cushion 16 in the case of the exemplary embodiment which is shown in the figures. The adjusting cushion 18 comprises a gap section 22 which is configured in a corresponding manner with respect to the recess 20. The recess 20 and gap section 22 comprise a conical, tapering cross section. As a result, a self-centering action of the seat assembly 2 is produced by way of the recess 20 and gap section 22. Moreover, the adjusting cushion 18 comprises a stop section 24 which protrudes beyond the recess 20 transversely with respect to the vertical axis of the tilting vehicle 4, and on which the base cushion 16 and the adjusting cushion 18 bear against one another, in a cover-like manner, on a side of the base cushion 16 which faces away from the seat pan 6, at least in the low seat position.

The base cushion 16 and the adjusting cushion 18 comprise an outer contour which continues in a flush and stepless manner with respect to one another, at least in the low seat position.

Moreover, the seat assembly 2 comprises a covering means 26 which surrounds the base cushion 16 and the adjusting cushion 18 at least approximately completely and is fixed on the seat pan 6. In the case of the exemplary embodiment which is shown in the figures, the covering means 26 is of elastically deformable configuration. As a result, the covering means 26 tensions the adjusting cushion 18 in the direction of the base cushion 16, and forms a return means.

In order to transfer the adjusting cushion 18 relative to the base cushion 16, the adjusting device 14 in the case of the exemplary embodiment which is shown in the figures comprises a pneumatically and/or hydraulically adjustable fluid cushion 28.

It can be seen from looking at the left-hand side of FIG. 1 that the volume of the fluid cushion 28 is at a minimum. In such cases, the adjusting cushion 18 is arranged with the seat face 12 which is arranged on the adjusting cushion 18 in a low seat position.

On the right-hand side of FIG. 1, the fluid cushion 28 is configured with an expanded volume. Here, the adjusting cushion 18 is moved relative to the base cushion 16, and a spacing between the seat face 12 and the seat pan 6 is extended.

The features of the invention which are disclosed in the preceding description, in the claims and in the drawing can be essential both individually and also in any desired combination to the implementation of the invention in its various embodiments.

LIST OF DESIGNATIONS

2 Seat assembly
4 Tilting vehicle
6 Seat pan
8 Frame
10 Cushion unit
12 Seat face
14 Adjusting device
16 Base cushion
18 Adjusting cushion
20 Recess
22 Gap section
24 Stop section
26 Covering means
28 Fluid cushion

What is claimed is:

1. An adjustable seat assembly for a tilting vehicle, comprising:
   a seat pan configured to be fixed in a stationary manner with respect to a frame of the tilting vehicle;
   at least one cushion unit arranged on the seat pan and forming a seat face on a side of the at least one cushion unit which faces away from the seat pan; and
   at least one adjusting device configured to at least one of
      transfer the seat face from a low seat position into at least one elevated seat position in which a spacing of the seat face from the seat pan is increased relative to the low seat position, and
      adjust an inclination of the seat face relative to the seat pan,
   wherein
      the adjusting device is located at a transverse center region of the adjustable seat assembly relative to a travel direction when the adjustable seat assembly is installed on the tilting vehicle,
      the cushion unit has at least one base cushion fixable in a stationary manner on the seat pan and is not movable relative to the seat pan, and at least one adjusting cushion which covers at least a portion of the base cushion, includes the seat face and is movable relative to the base cushion by the adjusting device,
      when in an installed position on the tilting vehicle, one of the base cushion and the adjusting cushion has at least one recess extending along a vertical axis of the tilting vehicle, and the other of the base cushion and the adjusting cushion has at least one engaging portion configured to engage the at least one recess along the vertical axis of the tilting vehicle,
      the adjusting cushion includes at least one stop section configured to protrude transverse to the vertical axis beyond the at least one recess, and
      the base cushion and the adjusting cushion bear against one another at least in the low seat position on a side of the base cushion which faces away from the seat pan with the at least one stop section being at least partially above at least one portion of the base cushion outside of the at least one recess.

2. The seat assembly according to claim 1, wherein the at least one recess includes, at least in sections, a cross section which tapers, and the at least one engaging portion has a cross section which corresponds to the recess cross section in the low seat position.

3. The seat assembly according to claim 1, wherein the adjusting cushion and the base cushion at least in the low seat position form an outer seat contour which is flush and stepless relative to one another.

4. The seat assembly according to claim 3, further comprising:
   at least one covering configured to surround the base cushion and the adjusting cushion on an outer side of the seat in the low seat position and in the elevated seat position.

5. The seat assembly according to claim 4, wherein the covering is fixed directly on the seat pan, and
   the covering at least one of
      includes a reserve surface configured to compensate for a surface difference between the low seat position and the elevated seat,
      is elastically deformable, and
      is fixable fixed indirectly on the seat pan by an elastic tensioner.

6. The seat assembly according to claim 4, wherein the covering at least one of
   prestresses the adjusting cushion into the low seat position, and
   includes a film or an elastic textile.

7. The seat assembly according to claim 1, wherein the adjusting device includes at least one fluid cushion which is adjustable at least one of pneumatically and hydraulically, and
   the adjusting device is arranged between the adjusting cushion and the seat pan or between the adjusting cushion and the base cushion.

8. A tilting vehicle with at least one seat assembly, comprising:
   a seat pan configured to be fixed in a stationary manner with respect to a frame of the tilting vehicle;
   at least one cushion unit arranged on the seat pan and forming a seat face on a side of the at least one cushion unit which faces away from the seat pan; and
   at least one adjusting device configured to at least one of transfer the seat face from a low seat position into at least one elevated seat position in which a spacing of the seat face from the seat pan is increased relative to the low seat position, and adjust an inclination of the seat face relative to the seat pan, wherein the adjusting device is located at a transverse center of the adjustable seat assembly relative to a travel direction when the adjustable seat assembly is installed on the tilting vehicle, the cushion unit has at least one base cushion fixable in a stationary manner on the seat pan and is not movable relative to the seat pan, and at least one adjusting cushion which covers at least a portion of the base cushion, includes the seat face and is movable relative to the base cushion by the adjusting device, when in an installed position on the tilting vehicle, one of the base cushion and the adjusting cushion has at least one recess extending along a vertical axis of the tilting vehicle, and the other of the base cushion and the adjusting cushion has at least one engaging portion configured to engage the at least one recess along the vertical axis of the tilting vehicle, the adjusting cushion includes at least one stop section configured to protrude transverse to the vertical axis beyond the at least one recess, and the base cushion and the adjusting cushion bear against one another at least in the low seat position on a side of the base cushion which faces away from the seat pan with the at least one stop section being at least partially above at least one portion of the base cushion outside of the at least one recess.

\* \* \* \* \*